United States Patent [19]

Sanders, Jr. et al.

[11] Patent Number: 5,030,252

[45] Date of Patent: Jul. 9, 1991

[54] BENZOTRIFLUORIDE ARYL ETHER GAS SEPARATION MEMBRANES

[75] Inventors: Edgar S. Sanders, Jr., Pittsburg; Theodore L. Parker, Walnut Creek, both of Calif.

[73] Assignee: The Dow Chemical Company, Midland, Mich.

[21] Appl. No.: 573,096

[22] Filed: Aug. 27, 1990

[51] Int. Cl.$^5$ .................. B01D 53/22; B01D 71/52
[52] U.S. Cl. .............................. 55/16; 55/68; 55/70; 55/73; 55/158
[58] Field of Search ............ 55/16, 68, 158, 70, 55/71, 73

[56] References Cited

U.S. PATENT DOCUMENTS

| | | | |
|---|---|---|---|
| 3,622,541 | 11/1971 | Darsow et al. | |
| 3,634,354 | 1/1972 | Darsow et al. | |
| 4,562,243 | 12/1985 | Percec | 528/174 |
| 4,634,742 | 1/1987 | Percec | 525/390 |
| 4,684,376 | 8/1987 | Percec et al. | 55/16 |
| 4,699,634 | 10/1987 | Percec et al. | 55/16 |
| 4,701,514 | 10/1987 | Percec | 528/174 |
| 4,749,756 | 6/1988 | Percec | 525/535 |
| 4,806,601 | 2/1989 | Percec | 525/391 |
| 4,818,254 | 4/1989 | Anand et al. | 55/16 |
| 4,827,054 | 5/1989 | Lau et al. | 570/141 |
| 4,838,904 | 6/1989 | Sanders, Jr. et al. | 55/16 X |
| 4,840,646 | 6/1989 | Anand et al. | 55/16 |
| 4,851,014 | 7/1989 | Jeanes | 55/16 |
| 4,964,890 | 10/1990 | Reuter et al. | 55/158 |
| 4,971,695 | 11/1990 | Kawakami et al. | 55/158 X |

FOREIGN PATENT DOCUMENTS 62-70452 3/1987 Japan .

OTHER PUBLICATIONS

Kellman et al., "Fluorinated Polyarylethersulfones Via Phase Transfer Catalyzed Nucleophilic Aromatic Substitution", *Polym. Prepr., Am. Chem. Soc., Div. Polym. Chem.*, 1980 21(2), 164–5 (Chemical Abstract only).

Kellman et al., "Aromatic Substitution in Condensation Polymerization Catalyzed by Solid–Liquid Phase Transfer", *ACS Symp. Ser.*, 1987 326 (Chemical Abstract only).

Shimizu et al., "Synthesis and Characterization of Fluorine-Containing Aromatic Polyethers from Tetrafluoroisophthalonitrile and Bisphenols", *J. Polym. Sci., Part A, Polym. Chem.*, 1987, 25(9), 2385–93 (Chemical Abstract only).

Tullos et al., "Polymers Derived from Hexafluoroacetone: 12F Poly(Ether Ketone)", *Polym. Mater. Sci. Eng.*, 1989, 60, 310–15 (Chemical Abstract only).

*Primary Examiner*—Robert Spitzer
*Attorney, Agent, or Firm*—Janet Pauline Clark

[57] ABSTRACT

The invention relates to novel benzotrifluoride aryl ether membranes and a process for separating gases using such membranes.

21 Claims, No Drawings

BENZOTRIFLUORIDE ARYL ETHER GAS SEPARATION MEMBRANES

BACKGROUND OF THE INVENTION

This invention relates to novel semi-permeable benzotrifluoride aryl ether gas separation membranes and a process of separating gases using said membranes.

The use of membranes to separate gases is known in the art. Membranes have been used to recover or isolate a variety of gases, including hydrogen, helium, oxygen, nitrogen, carbon monoxide, carbon dioxide, water vapor, hydrogen sulfide, ammonia, and/or light hydrocarbons. Applications of particular interest include the separation of hydrogen or helium from gas mixtures such as mixtures containing nitrogen, carbon monoxide, carbon dioxide, water vapor, and/or light hydrocarbons. For example, the separation and recycle of hydrogen is often necessary in various hydrocracker, hydrotreater, and catalytic cracking processes used in the oil refinery industry. Other applications of interest include the separation of carbon dioxide from light hydrocarbons or other crude oil components as part of the tertiary oil recovery process. Additional applications include the recovery of an enriched oxygen stream from air for use in enhanced combustion or fermentation processes. Alternately, an enriched nitrogen stream may be obtained from air for use as an inert atmosphere over flammable fluids or for food storage. Membranes can be used to achieve such separations.

Such membrane separations are based on the relative permeability of two or more gaseous components through the membrane. To separate a gas mixture into two portions, one richer and one leaner in at least one gaseous component, the mixture is brought into contact with one side of a semi-permeable membrane through which at least one of the gaseous components selectively permeates. A gaseous component which selectively permeates through the membrane passes through the membrane more rapidly than at least one other gaseous component of the mixture. The gas mixture is thereby separated into a stream which is enriched in the selectively permeating gaseous component or components and a stream which is depleted in the selectively permeating gaseous component or components. A relatively non-permeating gaseous component passes more slowly through the membrane than at least one other gaseous component of the mixture. An appropriate membrane material is chosen so that some degree of separation of the gas mixture can be achieved.

Membranes for gas separation have been fabricated from a wide variety of polymeric materials, including cellulose esters, aromatic polyimides, polyaramides, polysulfones, polyethersulfones, polyesters, and polycarbonates. An ideal gas separation membrane is characterized by the ability to operate under high temperatures and/or pressures while possessing a high gas separation factor (selectivity) and high gas permeability. Gas separation membranes also are preferably fabricated from polymers which are easily processed. The problem is finding membrane materials which possess all the desired characteristics. Polymers possessing high separation factors generally have low gas permeabilities, while those polymers possessing high gas permeabilities generally have low separation factors. In the past, a choice between a high gas separation factor and a high gas permeability has been unavoidably necessary. Furthermore, some of the polymeric membrane materials previously used for membranes suffer from the disadvantage of poor performance under high operating temperatures and pressures. However, those polymeric membrane materials capable of operating at high temperatures and pressures are typically difficult to fabricate into membranes. A membrane capable of separating gas mixtures which possesses high selectivity, high gas permeability, ability to operate under extreme conditions of temperature and pressure, and ease of fabrication is needed.

SUMMARY OF THE INVENTION

The invention is a semi-permeable gas separation membrane comprising a thin discriminating layer of a benzotrifluoride aryl ether polymer. In a preferred embodiment, the membrane comprises a thin discriminating layer of a benzotrifluoride aryl ether polymer corresponding to the formula:

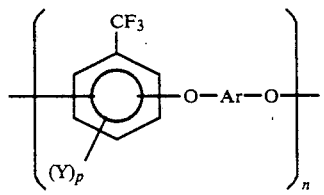

wherein
Ar is a divalent aromatic residue selected from the group consisting of:
A. an unsubstituted or inertly substituted phenylene, unsubstituted or inertly substituted naphthylene;
B.

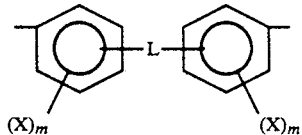

wherein
L is a direct bond, a divalent $C_{1-15}$ hydrocarbyl radical, a divalent $C_{1-8}$ halohydrocarbyl radical, $-O-$, $-CO-$, $-S-$, $-SO-$, $-SO_2-$, or $-SS-$,
X is individually in each occurrence a hydrogen radical, a monovalent $C_{1-4}$ hydrocarbyl radical, a $C_{1-4}$ halohydrocarbyl radical, or a halogen, and
m is an integer between 1 and 4 inclusive; and
C. a divalent bisphenyl fluorenyl or spiro indanyl radical; and
Y is individually in each occurrence a hydrogen radical, a monovalent $C_{1-4}$ hydrocarbyl radical, a $C_{1-4}$ halohydrocarbyl radical, or a halogen, and
p is an integer between 1 and 3 inclusive, and
n is a positive real number such that the membrane possesses adequate physical integrity under conditions of use.

In another aspect, the invention is a process of separating gases comprising:
A. contacting one side of a semi-permeable gas separation membrane comprising a thin discriminating layer of a benzotrifluoride aryl ether polymer with a feed gas mixture under pressure, wherein the membrane divides a separation chamber into a high pressure side into which the feed gas mixture is fed and a low pressure side;
B. maintaining a pressure differential across the membrane under conditions such that at least one gaseous component in the feed gas mixture selectively permeates through the membrane from the high pressure side to the low pressure side of the membrane;
C. removing from the low pressure side of the membrane permeated gas which is enriched in the selectively permeating gaseous component(s); and
D. removing from the high pressure side of the membrane non-permeated gas which is depleted in the selectively permeating gaseous component(s).

The membranes of this invention possess high gas permeability, adequate gas selectivity, adequate mechanical strength, good temperature resistance, and are readily fabricated.

DETAILED DESCRIPTION OF THE INVENTION

The gas separation membranes of this invention are fabricated from benzotrifluoride aryl ether polymers. The benzotrifluoride aryl ether polymers possess a polymer backbone structure which includes benzotrifluoride and aromatic residues connected by aryl ether linkages. The benzotrifluoride aryl ether polymers preferably possess a polymer backbone structure corresponding to the formula:

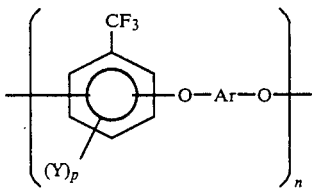

wherein
Ar is a divalent aromatic residue selected from the group consisting of:
A. an unsubstituted or inertly substituted phenylene, unsubstituted or inertly substituted naphthylene;
B.

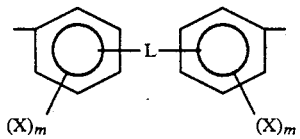

wherein
L is a direct bond, a divalent $C_{1-15}$ hydrocarbyl radical, a divalent $C_{1-8}$ halohydrocarbyl radical, —O—, —CO—, —S—, —SO—, —SO$_2$—, or —SS—,
X is individually in each occurrence a hydrogen radical, a monovalent $C_{1-4}$ hydrocarbyl radical, a monovalent $C_{1-4}$ halohydrocarbyl radical, or a halogen, and
m is an integer between 1 and 4 inclusive; and
C. a divalent bisphenyl fluorenyl or spiro indanyl radical; and
Y is individually in each occurrence a hydrogen radical, a monovalent $C_{1-4}$ hydrocarbyl radical, a $C_{1-4}$ halohydrocarbyl radical, or a halogen, and
p is an integer between 1 and 3 inclusive, and
n is a positive real number such that the membrane prepared therefrom possesses adequate physical integrity under conditions of use.

In the embodiment wherein Ar comprises an inertly substituted phenylene or naphthylene, the phenolic rings are partially or fully substituted with inert substituents, that is, substituents which do not substantially interfere with use of the polymer in the intended application. In many applications, this means that the inertly substituted sites on the phenolic rings are substantially chemically unreactive. Preferred inert substituents include monovalent $C_{1-8}$ hydrocarbyl radicals, monovalent $C_{1-8}$ hydrocarbyloxy radicals, and halogens. More preferred inert substituents include monovalent $C_{1-4}$ hydrocarbyl radicals, monovalent $C_{1-4}$ hydrocarbyloxy radicals, and halogens. Preferred halogens are fluorine, chlorine, bromine, and iodine; more preferred halogens are fluorine, chlorine, and bromine; even more preferred halogens are fluorine and chlorine; the most preferred halogen is fluorine.

In the embodiment wherein Ar comprises

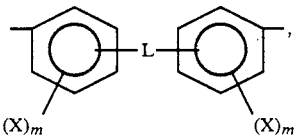

L is preferably a direct bond, a divalent $C_{1-8}$ hydrocarbyl radical, a divalent $C_{1-4}$ halohydrocarbyl radical, —O—, —CO—, —S—, —SO—, —SO$_2$—, or —SS—; L is more preferably a direct bond, a divalent $C_{1-4}$ hydrocarbyl radical, a divalent $C_{1-4}$ halohydrocarbyl radical, —O—, —CC—, —S—, —SO—, —SO$_2$—, or —SS—; L is even more preferably a direct bond, a divalent $C_{1-3}$ hydrocarbyl radical, or a divalent $C_{1-3}$ fluorohydrocarbyl radical; L is most preferably a direct bond or an unsubstituted or fluoro-substituted methylene or isopropylidene radical.

X is preferably a hydrogen radical, a monovalent $C_{1-3}$ hydrocarbyl radical, a monovalent $C_{1-3}$ halohydrocarbyl radical, or a halogen. For X, preferred halohydrocarbyl radicals include fluorohydrocarbyl radicals and preferred halogens include fluorine.

Y is preferably a hydrogen radical, a monovalent $C_{1-3}$ hydrocarbyl radical, a monovalent halohydrocarbyl radical, or a halogen. For Y, preferred halohydrocarbyl radicals include fluorocarbyl radicals and preferred halogens include fluorine.

n is preferably a real number of about 5 or greater, more preferably of about 10 or greater. n is preferably a real number of about 1,000 or less, more preferably of about 250 or less.

The benzotrifluoride aryl ether polymers useful in this invention may be prepared by condensation of a benzotrifluoride compound containing two displaceable groups, such as fluoride or chloride, with a bisphenolic compound under anhydrous basic conditions in an aprotic media. For example, the benzotrifluoride compound may be reacted with the bisphenolic compound in an aprotic solvent such as N-methyl-2-pyrrolidinone or N,N-dimethylacetamide, under nitrogen in the presence of a molar equivalent of potassium carbonate. The reaction mixture is typically heated to a temperature between about 40° C. and about 200° C. for a period of time sufficient to substantially form the polymer. The reaction mixture may then be neutralized and filtered and the polymer precipitated by contacting the filtrate with a mixture of an alcohol, such as methanol, and water.

The polymers so formed possess a number-average molecular weight ($M_n$) such that the polymers are useful for forming semi-permeable membranes. The number-average molecular weight of such polymers is preferably at least about 4,000, more preferably at least about 6,000; the number-average molecular weight of such polymers is preferably less than about 100,000, more preferably less than about 50,000. The intrinsic viscosity of such polymers is preferably between about 0.1 and about 2.0 deciliters/gram, more preferably between about 0.2 and about 1.0 deciliters/gram as measured in a dipolar aprotic solvent such as N-methyl-2-pyrrolidinone or dimethylacetamide. Such polymers are preferably soluble in common dipolar aprotic solvents such as N-methyl-2-pyrrolidinone, dimethylacetamide, dimethylformamide, dimethylsulfoxide, sulfolane, and chlorinated hydrocarbons.

The polymers useful in this invention preferably possess glass transition temperatures of at least about 100° C., more preferably of at least about 125° C., even more preferably of at least about 150° C. The polymers preferably possess a tensile strength as measured by ASTM D-1708 of at least about 4,000 psi, more preferably of at least about 5,000 psi. The polymers preferably possess a tensile modulus as measured by ASTM D-1708 of at least about 200,000 psi, more preferably of at least about 250,000 psi. The polymers preferably possess an elongation at break as measured by ASTM D-1708 of at least about 2 percent, more preferably of at least about 3 percent. The polymers preferably exhibit a weight loss at about 400° C. as measured by thermogravimetric analysis (TGA) of less than about 20 percent, more preferably of less than about 10 percent.

Such polymers are useful for preparing the semi-permeable membranes of the present invention. The membranes of this invention may possess any configuration known to one skilled in the art. In particular, the membranes may be shaped in the form of flat sheets or films, hollow fibers of various cross-sectional shapes, or hollow tubes. Films and hollow fibers of substantially circular cross-sections are preferred membrane configurations.

In addition, the membranes of this invention may possess any morphological structure known to one skilled in the art. In particular, the membranes may be a homogeneous membrane, a composite membrane, or an asymmetric membrane. Asymmetric and composite membranes are preferred; asymmetric membranes are more preferred. In the embodiment wherein the membranes possess a hollow fiber configuration, asymmetric membranes may have the discriminating region either on the outside of the hollow fiber, at the inside (lumen) surface of the hollow fiber, or located somewhere internal to both outside and inside hollow fiber membrane surfaces. In the embodiment wherein the discriminating region of the hollow fiber membranes is internal to both hollow fiber membrane surfaces, the inside surface and the outside surface of the hollow fiber membranes are porous, yet the membranes demonstrate the ability to separate gases.

Homogeneous membranes are prepared by forming a thin discriminating layer which is dense and free of voids and pores. Such membranes possess a discriminating layer which generally has substantially the same structure and composition throughout the membrane.

In one preferred embodiment, the benzotrifluoride aryl ether polymers useful in this invention are dissolved in a solvent, thus forming a polymer/solvent solution which is cast onto a uniform surface from which the membrane may thereafter be readily separated. Preferred casting solvents for the benzotrifluoride aryl ether polymers of this invention include chlorinated solvents such as methylene chloride and chloroform and dipolar aprotic solvents such as N-methyl-2-pyrrolidinone, N,N-dimethylacetamide, and dimethylsulfoxide. The polymer/solvent solution should be substantially homogeneous and possess sufficient viscosity to allow casting of the solution onto a uniform surface. Preferably, the solution of polymer/solvent contains polymer in weight percents of between about 3 and about 40, more preferably of between about 5 and about 20, even more preferably of between about 7 and about 15.

The solution is cast onto a uniform surface possessing a low surface energy such as silicone or coated glass, or a surface to which the membrane will not adhere such as mercury, or a liquid with which the polymer is substantially immiscible such as water. Alternately, the membrane may be cast onto a surface which may be dissolved away from the membrane following curing and drying. Casting is performed by pouring the solution onto the appropriate surface and using an appropriate tool to form a film of the appropriate thickness. A continuous casting process may be achieved by casting the solution onto endless belts or rotating drums. Thereafter, the cast solution is exposed to curing or drying conditions. Such conditions are used to substantially remove the solvent, thereby leaving a thin discriminating layer of polymer which is homogeneous. The solution may be cured or dried either by exposure to a vacuum, exposure to elevated temperatures, by allowing the solvent to evaporate over time, or any combination thereof. Generally, it is preferable to expose the cast solution to elevated temperatures which are below the glass transition temperature of the polymer, preferably less than about 180° C., more preferably less than about 150° C., even more preferably less than about 125° C.

Composite membranes are prepared by forming a thin discriminating layer on a porous supporting layer. Such membranes possess a discriminating layer which generally has a different structure and composition than the porous supporting layer. To prepare a composite membrane, a homogeneous discriminating layer can be formed and thereafter adhered to a porous supporting layer. Alternatively, the porous supporting layer can be the surface upon which the discriminating layer is cast. In such an embodiment, the composite membrane is prepared by casting a solution as a coating on the porous support. Penetration of the polymer from which the discriminating layer is formed into the pores of the porous supporting layer is acceptable so long as the desired thickness of the membrane is not exceeded. The porous supporting layer is characterized in that it preferably does not significantly impede the transport of gas through the membrane. In one embodiment, the porous supporting layer can be a metal or polymeric plate with a plurality of holes drilled through it. However, such a drilled plate is not advantageous because it may significantly reduce the effective area of the membrane. In a preferred embodiment, the porous supporting layer is a porous polymeric membrane. Examples of such porous polymeric membranes suitable as porous supporting layers in composite membranes include porous cellulose ester and polysulfone porous membranes commercially available under the tradenames MILLIPORE, PELLICONE, and DIAFLOW. Other porous membranes suitable as porous supporting layers include those comprised of polyolefins, polyetherketones, polyetheretherketones, polyesters, polyethersulfones, polycarbonates, and polyimides. Where such porous supporting membranes are thin or highly deformable, a frame or screen may also be used to adequately support the membrane. In one especially preferred embodiment, the porous polymeric supporting layer is a hollow fiber of a porous polymeric membrane such as a microporous polysulfone membrane. The hollow fiber itself provides adequate support for the discriminating layer coated on the inside or the outside surface of the hollow fiber. After the solution is cast onto the porous supporting layer to form the thin discriminating layer, the membrane is then exposed to curing or drying conditions to substantially remove solvent from the discriminating layer such as described hereinbefore for the formation of homogeneous membranes.

Asymmetric membranes are prepared by forming a thin discriminating layer on a porous supporting layer. Such membranes possess a discriminating layer which generally has the same composition but a different structure than the porous supporting layer. To prepare an asymmetric membrane, a solution of polymer, solvent, and optional non-solvent is formed and cast as hereinbefore described for homogeneous membranes. Preferred non-solvents for use in this invention include alcohols such as methanol and aliphatic hydrocarbons such as heptane. The cast solution is partially cured to remove a portion of the solvent and optional non-solvent. Thereafter, one or both surfaces of the partially cured membrane is contacted with a non-solvent for the polymer such as water so as to form a thin discriminating layer on one or both sides of the membrane while substantially removing the solvent and optional non-solvent from the membrane. The porous supporting layer formed provides support for the thin discriminating layer without significantly impeding the transport of gas through the membrane. The drying step is performed in a manner similar to that described hereinbefore with respect to the formation of homogeneous membranes.

Flat sheet, tubular, and hollow fiber membranes which are homogeneous, composite, or asymmetric may be formed by extrusion from an appropriate solution of the polymer in a solvent and optional non-solvent. Such extrusion processes are well known to those skilled in the art and the formation of such membranes requires the adaptation of the hereinbefore described techniques.

Extrusion is the preferred process for the fabrication of flat sheet, tubular, or hollow fiber membranes. In the case of extrusion, the components of the extrusion mixture may be combined prior to extrusion by mixing in any convenient manner with conventional mixing equipment, as for example, in a Hobart mixer. Alternately, the extrusion mixture may be homogenized by extruding the mixture through a twin screw extruder, cooling the extrudate, and grinding or pelletizing the extrudate to a particle size readily fed to a single or twin screw extruder. The components of the extrusion mixture may also be combined directly in a melt-pot or twin screw extruder and extruded into membranes in a single step.

The polymer, solvent, and optional non-solvent mixture is heated to a temperature at which the mixture becomes a homogeneous fluid. The homogeneous fluid is then extruded through a sheet, hollow tube, or hollow fiber die (spinnerette). Hollow fiber spinnerettes are typically multi-holed and thus produce a tow of multiple hollow fibers. The hollow fiber spinnerettes include a means for supplying fluid to the core of the extrudate. The core fluid is used to prevent collapse of the hollow fibers as they exit the spinnerette. The core fluid may be a gas such as nitrogen, air, carbon dioxide, or other inert gas, or a liquid which is a non-solvent for the polymer such as water. Following extrusion, the membrane is treated as hereinbefore described for homogeneous, composite, or asymmetric membranes.

In one preferred embodiment, the membranes are annealed before use. The membrane is preferably exposed to temperatures above about 50° C. and about 15° C. below the glass transition temperature of the polymer for a period of time sufficient to partially densify the polymer. This procedure may optionally be performed under vacuum.

Preferably, the homogeneous membranes useful in this invention have a thickness of between about 1 and about 500 microns, more preferably between about 5 and about 150 microns, even more preferably between about 5 and about 50 microns. Hollow fiber homogeneous membranes preferably have an outer diameter of between about 50 and about 800 microns, more preferably between about 50 and about 300 microns, even more preferably between about 100 and about 250 microns. Preferably, the discriminating layer in composite or asymmetric membranes possesses a thickness of between about 0.02 and about 10 microns, more preferably between about 0.02 and about 2 microns, even more preferably between about 0.02 and about 1 micron. Preferably, the supporting layer in composite or asymmetric membranes possesses a thickness of between about 5 and about 500 microns, more preferably between about 10 and about 150 microns. Hollow fiber composite or asymmetric membranes preferably have an outer diameter in the range of from about 50 to about 800 microns, more preferably in the range of from about 50 to about 300 microns, even more preferably in the range of from about 100 to about 250 microns.

The membranes are fabricated into flat sheet, spiral wound, tubular, or hollow fiber devices by methods known in the art. See U.S. Pat. Nos. 3,228,876; 3,422,008; 3,455,460; 3,475,331; 3,526,001; 3,528,553; 3,690,465; 3,702,658; 3,755,034; 3,801,401; 4,271,900; 3,872,014; 3,966,616; 4,045,851; 4,061,574; 4,080,296; 4,083,780; 4,220,535; 4,235,723; 4,265,763; 4,315,819; 4,430,219; 4,351,092; 4,367,139; 4,666,469; 4,707,267; 4,752,305; 4,758,341; 4,871,379; and 4,929,259; the relevant portions of each patent incorporated herein by reference for all legal purposes which may be served thereby.

The membranes are sealingly mounted in a pressure vessel in such a manner that the membrane separates the vessel into two fluid regions wherein fluid flow between the two regions is accomplished by fluid permeating through the membrane. Under certain conditions, it may be highly desirable to provide support for the membrane when the membrane is employed in a separation apparatus or process. In one embodiment, the peripheral area of the membrane is affixed to a framing structure which supports the outer edge of the membrane. The membrane can be affixed to the framing structure by a clamping mechanism, adhesive, chemical bonding, or other techniques known in the art. The membrane affixed to the frame can then be sealingly engaged in the conventional manner in a vessel so that the membrane surface inside the framing support separates two otherwise non-communicating regions in the vessel. One skilled in the art will recognize that the structure which supports the membrane can be an internal part of the vessel or even the outer edge of the membrane.

The membrane divides the separation chamber into two regions, a high pressure side into which the feed gas mixture is introduced and a lower pressure side. One side of the membrane is contacted with a feed gas mixture under pressure, while a pressure differential is maintained across the membrane. In the embodiment wherein the membrane is in hollow fiber form, the feed gas mixture may be introduced on the outside or the inside of the hollow fiber. At least one gaseous component in the gas mixture selectively permeates through the membrane more rapidly than the other gaseous component(s) in the gas mixture. Gas which is enriched in the selectively permeating gaseous component(s) is thus obtained on the low pressure side of the membrane which is removed from the low pressure side of the membrane as permeate. Gas depleted in the selectively permeating gaseous component(s) is obtained on the high pressure side of the membrane which is removed from the high pressure side of the membrane as non-permeate.

$$P = \frac{\text{Gas permeability is defined as}}{\text{(area) (time) (driving force across the membrane)}}$$

A standard permeability measurement unit is the Barrer (Ba), which is equal to $$10^{-10} \frac{\text{(centimeter)}^3 \text{ (STP) (cetimeter)}}{\text{(centimeter)}^2 \text{ (second) (centimeter Hg)}},$$

abbreviated hereinafter as $$10^{-10} \frac{\text{cm}^3 \text{ (STP) cm}}{\text{cm}^2 \text{ s cmHg}}.$$

The reduced gas flux is defined as (permeability)÷(membrane thickness). A standard reduced flux unit is $$10^{-6} \frac{\text{(centimeter)}^3 \text{ (STP)}}{\text{(centimeter)}^2 \text{ (second) (centimeter Hg)}},$$

abbreviated hereinafter as $$10^{-6} \frac{\text{cm}^3 \text{ (STP)}}{\text{cm}^2 \text{ s cmHg}}.$$

The gas separation factor (selectivity) is defined as the ratio of the permeability or flux of the faster permeating gas to the permeability or flux of the slower permeating gas.

The membranes of this invention are useful for separating gas mixtures containing at least one gas selected from the group consisting of hydrogen, helium, oxygen, nitrogen, carbon monoxide, carbon dioxide, water vapor, hydrogen sulfide, ammonia, and light hydrocarbons. As used herein, the term light hydrocarbons refers to gaseous saturated and unsaturated $C_{1-4}$ hydrocarbons such as methane, ethane, ethylene, propane, propylene, butane, and butylene.

The membranes of this invention preferably possess a separation factor at about 30° C. for helium/methane of at least about 5, more preferably of at least about 10, even more preferably of at least about 25. The membranes of this invention preferably possess a permeability for helium of at least about 25 Barrers, more preferably of at least about 100 Barrers.

The membranes of this invention preferably possess a separation factor at about 30° C. for oxygen/nitrogen of at least about 1.25, more preferably of at least about 1.5. The membranes of this invention preferably possess a permeability for oxygen of at least about 5 Barrers, more preferably of at least about 25 Barrers.

The separation process is carried out at pressures and temperatures which do not deleteriously affect the membrane. Preferably, the pressure on the high pressure side of the membrane is between about 10 psig and about 1000 psig, more preferably between about 50 psig and about 500 psig. The temperature of the feed gas mixture is preferably between about 0° C. and about 150° C., more preferably between about 5° C. and about 100° C.

The membrane separation process of this invention may be combined with non-membrane separation processes such as cryogenics and pressure swing adsorption.

SPECIFIC EMBODIMENTS

The following Examples are included to illustrate the invention and are not intended to limit the scope of the invention or claims.

EXAMPLE 1

Preparation Of Polymer From Heptafluorotoluene And Bisphenol A

A benzotrifluoride aryl ether polymer was prepared from heptafluorotoluene and bisphenol A using the following procedure. A round bottomed flask equipped with a mechanical stirrer, Dean-Stark apparatus, condenser, controller probe, and gas inlet and outlet was charged with about 80 milliliters of N-methyl-2-pyrrolidinone, about 65 milliliters of toluene, about 7.83 grams of para-bisphenol A (2,2-bis(4-hydroxyphenyl)-propane), and about 9.94 grams of ground potassium carbonate. The flask was slowly purged with nitrogen during the polymerization. The reaction mixture was heated and the water removed azeotropically at about 145° C. to about 150° C. over a period of about ¾ hour. The toluene was then distilled out at about 190° C. and removed from the flask. The reaction mixture was then cooled to about 75° C. before adding about 7.48 grams of heptafluorotoluene. The reaction mixture temperature was gradually increased to about 160° C. and the reaction mixture heated for about 4 and ½ hours. The hot reaction mixture was neutralized with acetic acid and filtered through a preheated glass frit. The polymer was precipitated by pouring the filtrate into a mixture of about 70 volume percent methanol and 30 volume percent water. The precipitate was collected by filtration, washed with methanol, and dried under vacuum, yielding about 12.2 grams of polymer.

The glass transition of the polymer was determined to be about 162° C. as measured by Differential Scanning Calorimetry (DSC), using a duPont 1090 apparatus scanning at a rate of about 10° C./minute. The polymer exhibited a tensile strength of about 8140 psi, a tensile modulus of about 346 kpsi, and an elongation at break of about 3.9 percent, as measured by ASTM D-1708. Thermogravimetric analysis (TGA), using a duPont 1090 apparatus scanning under air at a rate of about 10° C./minute, determined the 10 percent loss temperature to be about 468° C. The polymer structure was verified by $19_F$ nmr using a GE-300 instrument, with $CFCl_3$ as the standard and $CDCl_3$ as the solvent.

EXAMPLE 2

Preparation Of Polymer From Heptafluorotoluene And Bisphenol $AF_6$

A benzotrifluoride aryl ether polymer was prepared from heptafluorotoluene and bisphenol $AF_6$ (2,2-bis(4-hydroxyphenyl)-1,1,1,3,3,3-hexafluoropropane) using the following procedure. A round bottomed flask equipped with a mechanical stirrer, Dean-Stark apparatus, condenser, controller probe, and gas inlet and outlet was charged with about 100 milliliters of N,N-dimethylacetamide, about 5.16 grams of a,a,a,2,3,5,6-heptafluorotoluene, about 7.95 grams bisphenol $AF_6$, and about 13.06 grams ground potassium carbonate. The flask was slowly purged with nitrogen during the polymerization. The reaction mixture was stirred at ambient temperature for about 5 and ½ hours, heated at about 80° C. for about 42 hours, and heated at about 100° C. for about 21 hours. About 0.08 grams additional bisphenol $AF_6$ was added to the reaction mixture and heating continued at about 100° C. for about 4 hours before adding N,N-dimethylacetamide and acetic acid to neutralize the polymer. The reaction mixture was filtered through a preheated glass frit, and the polymer was precipitated by pouring the filtrate into a mixture of about 70 volume percent methanol and 30 volume percent water. The precipitate was collected by filtration, washed with methanol, and dried under vacuum.

The glass transition of the polymer was determined to be about 186° C. as measured by Differential Scanning Calorimetry (DSC), using a duPont 1090 apparatus scanning at a rate of about 10° C./minute. The polymer exhibited a tensile strength of about 6450 psi, a tensile modulus of about 349 kpsi, and an elongation at break of about 3.8 percent, as measured by ASTM D-1708. Thermogravimetric analysis (TGA), using a duPont 1090 apparatus scanning under air at a rate of about 10° C./minute, determined the 10 percent loss temperature to be about 519° C. The polymer structure was verified by $19_F$ nmr using a GE-300 instrument, with $CFCl_3$ as the standard and $CDCl_3$ as the solvent.

EXAMPLE 3

Preparation Of Polymer From 2,4-Dichlorobenzotrifluoride And Bisphenol A

A benzotrifluoride aryl ether polymer was prepared from 2,4-dichlorobenzotrifluoride and bisphenol A using the following procedure. A round bottomed flask equipped with a mechanical stirrer, Dean-Stark apparatus, condenser, controller probe, and gas inlet and outlet was charged with about 80 milliliters of N-methyl-2-pyrrolidinone, about 40 milliliters of toluene, about 8.64 grams of para-bisphenol A (2,2-bis(4-hydroxyphenyl)-propane), and about 10.96 grams of ground potassium carbonate. The Dean-Stark apparatus was charged with about 25 milliliters of toluene. The flask was slowly purged with nitrogen during the polymerization. The reaction mixture was heated and the water removed azeotropically at about 145° C. to about 150° C. over a period of about ½ hour. The temperature was then increased to about 160° C. and the toluene was distilled out and removed from the flask. The reaction mixture was then cooled to about 75° C. before adding about 8.02 grams of purified 2,4-dichlorobenzotrifluoride. The reaction mixture temperature was gradually increased to about 140° C. for about 75 minutes, then about 165° C. for about 90 minutes, then about 180° C. for about 18 hours. The hot reaction mixture was cooled to about 150° C., neutralized with acetic acid, and filtered through a preheated glass frit. Filtrate was dried under vacuum, yielding about 10.7 grams of polymer.

The glass transition of the polymer was determined to be about 82° C. as measured by Differential Scanning Calorimetry (DSC), using a duPont 1090 apparatus scanning at a rate of about 10° C./minute.

EXAMPLE 4

Preparation Of Membranes

The polymers of Examples 1 and 2 were used to prepare membranes therefrom. Films were cast from about 20 weight percent polymer solutions onto glass plates. Residual solvent was removed from the films by heating at about 70° C. to about 100° C. for up to several hours. The films were then removed from the glass plates with water, after which the films were air dried. The resulting membranes possessed a thickness of about 37 microns for the polymer of Example 1 and about 30 microns for the polymer of Example 2. The gas permeabilities of helium, methane, ethane, ethylene, oxygen, and nitrogen were measured on about 3.8 centimeter diameter film samples at a temperature of about 30° C. using the constant-volume, variable-pressure method. Gas selectivities for helium/methane, helium/ethane, helium/ethylene, and oxygen/nitrogen were computed from the corresponding single gas permeabilities. Data for the membranes of Examples 1 and 2, compared with bisphenol A polycarbonate (Bis A PC) and hexafluorobisphenol A polycarbonate (Bis $AF_6$) membranes respectively, are reported in Table I.

TABLE I

| Polymer | Permeability (Barrers) | | Selectivity | | | |
|---|---|---|---|---|---|---|
| | Helium | Oxygen | $He/CH_4$ | $He/C_2H_4$ | $He/C_2H_6$ | $O_2/N_2$ |
| Bis A PC | 13 | 1.6 | 35 | — | — | 4.8 |
| Example 1 | 33 | 5.4 | 30 | 19 | 16 | 1.33 |
| Bis $AF_6$ PC | 60 | 6.9 | 57 | — | — | 4.1 |
| Example 2 | 175 | 25.7 | 9 | 9 | 10 | 1.7 |

The benzotrifluoride aryl ether polymer membranes possess significantly higher gas permeabilities for both helium and oxygen than the corresponding polycarbonate membranes.

What is claimed is:

1. A process of separating gases comprising:
   A. contacting one side of a semi-permeable gas separation membrane comprising a thin discriminating layer of a benzotrifluoride aryl ether polymer with a feed gas mixture under pressure, wherein the membrane divides a separation chamber into a high pressure side into which the feed gas mixture is fed and a low pressure side;

B. maintaining a pressure differential across the membrane under conditions such that at least one gaseous component in the feed gas mixture selectively permeaters through the membrane from the high pressure side to the low pressure side of the membrane;

C. removing from the low pressure side of the membrane permeated gas which is enriched in the selectively permeating gaseous component(s); and D. removing from the high pressure side of the membrane non-permeated gas which is depleted in the selectively permeating gaseous component(s).

2. The process of claim 1 wherein the feed gas mixture contains at least one of the gases selected from the group consisting of hydrogen, helium, oxygen, nitrogen, carbon monoxide, carbon dioxide, water vapor, hydrogen sulfide, ammonia, and light hydrocarbons.

3. The process of claim 2 wherein the pressure of the feed gas mixture is between about 5 psig and about 1000 psig.

4. The process of claim 3 wherein the temperature of the feed gas mixture is between about 0° C. and about 150° C.

5. A semi-permeable gas separation membrane comprising a thin discriminating layer of a benzotrifluoride aryl ether polymer.

6. The membrane of claim 5 wherein the benzotrifluoride aryl ether polymer comprises a polymer backbone structure corresponding to the formula:

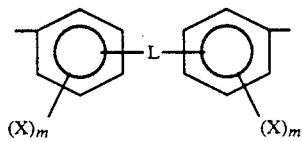

wherein

Ar is a divalent aromatic residue selected from the group consisting of:

A. an unsubstituted or inertly substituted phenylene, unsubstituted or inertly substituted naphthylene;

B.

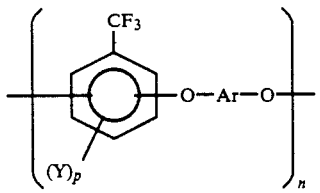

wherein

L is a direct bond, a divalent $C_{1-15}$ hydrocarbyl radical, a divalent $C_{1-8}$ halohydrocarbyl radical, —O—, —CO—, —S—, —SO—, —SO$_2$—, or —SS—, X is individually in each occurrence a hydrogen radical, a monovalent $C_{1-4}$ hydrocarbyl radical, a monovalent $C_{1-4}$ halohydrocarbyl radical, or a halogen, and m is an integer between 1 and 4 inclusive; and C. a divalent bisphenyl fluorenyl or spiro indanyl radical; and Y is individually in each occurrence a hydrogen radical, a monovalent $C_{1-4}$ hydrocarbyl radical, a $C_{1-4}$ halohydrocarbyl radical, or a halogen, and p is an integer between 1 and 3 inclusive, and n is a positive real number such that the membrane possesses adequate physical integrity under conditions of use.

7. The membrane of claim 6 wherein Ar comprises an inertly substituted phenylene or naphthylene, wherein the inert substituents are selected from the group consisting of a monovalent $C_{1-8}$ hydrocarbyl radical, a monovalent $C_{1-8}$ hydrocarbyloxy radical, and a halogen.

8. The membrane of claim 7 wherein the inert substituents are selected from the group consisting of a monovalent $C_{1-4}$ hydrocarbyl radical, a monovalent $C_{1-4}$ hydrocarbyloxy radical, and a halogen.

9. The membrane of claim 8 wherein the inert substituents comprise a halogen selected from the group consisting of fluorine, chlorine, and bromine.

10. The membrane of claim 6 wherein Ar comprises

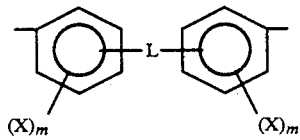

wherein

L is selected from the group consisting of a direct bond, a divalent $C_{1-8}$ hydrocarbyl radical, a divalent $C_{1-4}$ halohydrocarbyl radical, —O—, —CO—, —S—, —SO—, —SO$_2$—, and —SS—.

11. The membrane of claim 10 wherein L is selected from the group consisting of a direct bond, a divalent $C_{1-4}$ hydrocarbyl radical, a divalent $C_{1-4}$ halohydrocarbyl radical, —O—, —CO—, —S—, —SO—, —SO$_2$—, and —SS—.

12. The membrane of claim 11 wherein L is selected from the group consisting of a direct bond, a divalent $C_{1-3}$ hydrocarbyl radical, and a divalent $C_{1-3}$ fluorohydrocarbyl radical.

13. The membrane of claim 12 wherein L is selected from the group consisting of a direct bond, an unsubstituted or fluoro-substituted methylene radical, and an unsubstituted or fluoro-substituted isopropylidene radical.

14. The membrane of claim 6 wherein Ar comprises

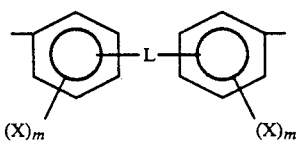

wherein

X is selected from the group consisting of a hydrogen radical, a monovalent $C_{1-3}$ hydrocarbyl radical, a monovalent $C_{1-3}$ halohydrocarbyl radical, and a halogen.

15. The membrane of claim 14 wherein X is selected from the group consisting of a fluorohydrocarbyl radical and fluorine.

16. The membrane of claim 6 wherein the membrane is composite or asymmetric.

17. The membrane of claim 6 wherein the membrane is a hollow fiber.

18. The membrane of claim 6 wherein the separation factor for helium methane at about 30° C. is at least about 5.

19. The membrane of claim 6 wherein the permeability for helium is at least about 25 Barrers.

20. The membrane of claim 6 wherein the separation factor for oxygen/nitrogen at about 25° C. is at least about 1.25.

21. The membrane of claim 6 wherein the permeability for oxygen is at least about 5 Barrers.

* * * * *